United States Patent
Obrecht et al.

(10) Patent No.: US 7,342,084 B2
(45) Date of Patent: Mar. 11, 2008

(54) PEROXIDICALLY CROSSLINKED HYDROGENATED VINYLPOLYBUTADIENES AND THEIR USE FOR PRODUCTION OF TECHNICAL RUBBER PRODUCTS WITH GOOD RECOVERY PERFORMANCE OVER A WIDE TEMPERATURE RANGE

(75) Inventors: Werner Obrecht, Moers (DE); Andreas Bischoff, Dormagen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/521,998

(22) Filed: Sep. 15, 2006

(65) Prior Publication Data

US 2007/0066763 A1    Mar. 22, 2007

(30) Foreign Application Priority Data

Sep. 17, 2005    (DE) .................... 10 2005 044 453

(51) Int. Cl.
*C08F 36/06* (2006.01)
*C08F 8/06* (2006.01)
*C08C 19/04* (2006.01)

(52) U.S. Cl. .................... 526/335; 525/338; 525/383; 525/387

(58) Field of Classification Search ............... 526/335; 525/338, 383, 387

See application file for complete search history.

(56) References Cited

U.S. PATENT DOCUMENTS

| | | | |
|---|---|---|---|
| 4,212,958 A * | 7/1980 | Falk | 525/310 |
| 4,912,182 A | 3/1990 | Castner et al. | 524/142 |
| 5,620,939 A | 4/1997 | Halasa et al. | 502/154 |
| 5,879,805 A | 3/1999 | Brady et al. | 428/407 |
| 7,176,262 B2 | 2/2007 | Stere et al. | 525/338 |

FOREIGN PATENT DOCUMENTS

| | | |
|---|---|---|
| EP | 1 693 411 | 8/2006 |
| WO | 2006/060896 | 6/2006 |

OTHER PUBLICATIONS

P.R. Dluzneski "Peroxide Vulcanization of Elastomers", Rubber Chemistry and Technology 74(3), 451-491 (2002).
J.D. van Drumpt "Peroxide crosslinking: a strength/weakness analysis vs sulphur vulcanization", Rubber World, Mar. 1988, pp. 33-41.

* cited by examiner

*Primary Examiner*—Ling-Sui Choi
(74) *Attorney, Agent, or Firm*—Nicanor A. Kohncke

(57) ABSTRACT

The present invention provides peroxidically crosslinked hydrogenated vinylpolybutadienes which serve for production of technical rubber products and which have very good recovery performance over a wide temperature range.

3 Claims, No Drawings

PEROXIDICALLY CROSSLINKED HYDROGENATED VINYLPOLYBUTADIENES AND THEIR USE FOR PRODUCTION OF TECHNICAL RUBBER PRODUCTS WITH GOOD RECOVERY PERFORMANCE OVER A WIDE TEMPERATURE RANGE

FIELD OF THE INVENTION

The present invention provides peroxidically crosslinked hydrogenated vinylpolybutadienes which serve for production of technical rubber products and which have very good recovery performance over a wide temperature range.

BACKGROUND OF THE INVENTION

It is known that technical rubber products based for example on ethylene/propylene/(diene) (EP(D)M) polymers are used in sectors where good recovery performance of these rubber products is demanded. By way of example, rubber products based on EP(D)M rubbers are used as hoses, gaskets of any type, profiles, bearings and dampers, membranes, and composite articles composed of rubber/metal, rubber/plastic and rubber/textile. As mentioned, good resilience plays a particular part in the use of these technical rubber products, i.e. the resilience values from a vulcanizate after compression and after prolonged exposure have to be as high as possible, or the residual deformation values after compression (compression set to DIN 53517 A) have to be as low as possible. The variables relevant in this collection are the compression set to DIN 53517 A and the compressive stress relaxation to DIN 53537.

Continuing advances in technical development in the application sectors mentioned mean that improved recovery performance of the rubber products used is desirable over a wide temperature range.

SUMMARY OF THE INVENTION

It was therefore an object of the present invention to arrive at a suitable selection of hydrogenated vinylpolybutadienes with which a peroxidic crosslinking method can be used to permit achievement of a certain level of vulcanizate properties, such as hardness, elasticity, strength, stress values at various tensile strain values, ultimate tensile strength, ultimate tensile strain, and certain compression set values, thus permitting compliance with important properties specified for technical use, in particular good recovery performance.

It has now been found that peroxidically hydrogenated vinylpolybutadienes have this type of property profile over a wide temperature range, in particular being superior in this respect to the EP(D)M-based rubber products widely used nowadays.

DETAILED DESCRIPTION OF THE INVENTION

The invention therefore provides peroxidically crosslinked hydrogenated vinylpolybutadienes characterized in that they have compression set values in the range from

| a) | 0 to 14% | at 23° C./70 h, |
| b) | 0 to 19% | at 100° C./70 h, |
| c) | 0 to 20% | at 125° C./70 h and |
| d) | 0 to 28% | at 150° C./70 h (determined to DIN 53 517 A) | and compressive stress relaxation values in the range from

| e) | 0 to 10% | at 23° C./24 h, |
| f) | 0 to 12% | at 23° C./72 h and |
| g) | 0 to 15% | at 23° C./168 h (determined to DIN 53 517 A). |

Preference is given to peroxidically crosslinked hydrogenated vinylpolybutadienes, characterized in that they have compression set values in the range from

| a) | 3 to 11% | at 23° C./70 h, |
| b) | 4 to 16% | at 100° C./70° C. |
| c) | 6 to 18% | at 125° C./70 h and |
| d) | 10 to 25% | at 150° C./70 h | and compressive stress relaxation values in the range from

| a) | 2 to 8% | at 23° C./24 h, |
| b) | 3 to 10% | at 23° C./72 h and |
| c) | 5 to 12% | at 23° C./168 h. |

The inventive peroxidically crosslinked vinylpolybutadienes moreover also have the following physical properties:

tensile strain at break: from 400% to 900% at 23° C. (determined to DIN 53504) and ultimate tensile strength: from 10 MPa to 14 MPa at 23° C. (determined to DIN 53504).

Hydrogenated vinylpolybutadienes as generally described in DE 10 324 304 A1 are used for preparation of the inventive peroxidically crosslinked hydrogenated vinylpolybutadienes. In order to achieve the very good recovery performance of the inventively crosslinked hydrogenated vinylpolybutadienes over a wide temperature range, specific hydrogenated vinylpolybutadienes are selected for crosslinking and have a certain property profile, e.g. Mooney values (ML 1+4/125° C.) of from 40 to 150 Mooney units, degrees of hydrogenation of from 70 to 100% and enthalpies of fusion in the range from 0 to 10 J/g.

It is preferable to select hydrogenated vinylpolybutadienes with Mooney values in the range from 60 to 140 Mooney units, degrees of hydrogenation of from 80 to 100% and enthalpies of fusion of from 0 to 5 J/g.

The hydrogenated vinylpolybutadienes to be selected for the inventive peroxidic crosslinking can be prepared by the preparation processes described in the Laid-Open German Specification mentioned. By way of example, it is possible that the hydrogenated vinylpolybutadienes to be used as starting products are prepared via anionic polymerization of butadiene with butyllithium or sec-butyllithium in the presence of benzene, of technical hexane mixtures, or cyclohexane as solvent, while setting the required vinyl content by means of additives such as tetramethylethylenediamine, dimethyloxyethane, butoxyethoxyethane and/or THF at temperatures of from 20° C. to 150° C. The hydrogenation of the resultant vinylpolybutadienes can take place by means of a catalyst based on Ni(oct)$_2$/triethylaluminium, Co(oct)$_2$/triethylaluminium, dicyclopentadienyltitanium dichloride/BuLi or dicyclopentadienyltitanium dichloride/triethylaluminium, or tris(triphenylphosphine)rhodium(I) chloride (Wilkinson catalyst) in the presence of the abovementioned solvents. The solvent used for the hydrogenation is preferably the same as that used for the preparation of the vinylpolybutadiene, with no isolation of the vinylpolybutadiene (in-situ hydrogenation). Prior to isolation of the hydrogenated polymer from the solution, the hydrogenation catalyst is removed. A conventional antioxidant is also added prior to work-up.

As mentioned above, the specifically selected hydrogenated vinylpolybutadienes are crosslinked with the aid in particular of peroxides. It is also possible to use azo compounds or else high-energy radiation for the crosslinking reaction. Crosslinking by means of peroxides is known to the person skilled in the art and by way of example is generally described in P. R. Dluzneski "Peroxide Vulcanization of Elastomers", Rubber Chemistry and Technology 74(3), 451 (2001) and in J. D. van Drumpt "Peroxide crosslinking: a strength/weakness analysis vs sulphur vulcanization" Rubber World, March 1998, pp. 33-41.

Peroxidic compounds which may be mentioned and are suitable for the crosslinking of the hydrogenated vinylpolybutadienes are: organic peroxides which may be of symmetrical or asymmetrical structure, e.g. diacyl peroxides, peroxydicarbonates, dialkyl peroxides, peresters, peroxyketals, peroxyketones, and hydroperoxides.

Examples of organic peroxides of symmetrical structure are dicumyl peroxide, bis(tert-butyl-peroxyisopropyl)benzene, di-tert-butyl peroxide, 2,5-dimethylhexane 2,5-dihydroperoxide, 2,5-dimethylhexyne 2,5-dihydroperoxide, dibenzoyl peroxide and bis(2,4-dichlorobenzoyl) peroxide. Examples of organic peroxides of asymmetrical structure are: tert-butyl perbenzoate, tert-butyl peroxyacetate, 4,4-di-tert-butylperoxybutane, 4,4-di-tert-butylperoxy-n-butyl valerate, tert-butyl peroxydiethylacetate, tert-butyl peroxyisobutyrate and tert-butyl cumyl peroxide.

Diacyl peroxides which can be used are: dibenzoyl peroxide, bis(2,4-dichlorobenzoyl)peroxide, tert-butyl perbenzoate, dilauroyl peroxide, dioctanoyl peroxide, dipropionyl peroxide, bis(3,5,5-trimethylhexanoyl)peroxide, bis(orthomethylbenzoyl)peroxide, tert-butyl peroxypivalate, tert-butyl peroxyneodecanoate, tert-butyl peroxy-2-ethylhexanoate, acetylcyclohexanesulphonyl peroxide, and examples of peroxydicarbonates which can be used are: bis(2-ethylhexyl)peroxydicarbonate, bis(4-tert-butylcyclohexyl)peroxydicarbonate, dicyclohexyl peroxydicarbonate, di-n-propyl peroxydicarbonate, di-n-butyl peroxydicarbonate, dicetyl peroxydicarbonate, di-sec-butyl peroxydicarbonate, diisopropyl peroxydicarbonate, tert-butyl peroxy isopropyl carbonate, and examples of dialkyl peroxides which can be used are: α,α'-di(tert-butylperoxy)-m/p-diisopropylbenzene, dicumyl peroxide, 2,5-dimethyl-2,5-di(tert-butylperoxy)hexane, tert-butyl cumyl peroxide, 2,5-dimethyl-2,5-di(tert-butylperoxy)hex-3yne, and examples of peroxyketals which can be used are: 1,1-bis(tert-butylperoxy)-3,3,5-trimethylcyclohexane, 1,1-di(tert-butylperoxy)cyclohexane, 1,1-di(tert-amylperoxy)cyclohexane, ethyl 3,3-di(t-butylperoxy)butyrate, ethyl 3,3-di(tert-amylperoxy)butyrate, and hydroxyperoxides, e.g. cumyl hydroperoxide, diisopropylbenzene monohydroperoxide and tert-butyl hydroperoxide.

The peroxides mentioned can be used either individually or else in mixtures, or in a mixture with the azo compounds mentioned below.

The following peroxidic compounds are preferably used for the crosslinking of hydrogenated vinylpolybutadienes: dicumyl peroxide bis(2,4-dichlorobenzoyl)peroxide, dibenzoyl peroxide, dimethylhexyne 2,5-dihydroperoxide and 2,5-dimethylhexane 2,5-dihydroperoxide.

It is moreover likewise possible—as mentioned—to use, for the crosslinking reaction, certain azo compounds which, like peroxides, decompose to give radicals during the crosslinking reaction. Examples which may be mentioned are azobisisobutyronitrile, 2,2'-azobis(2,4-dimethylvaleronitrile) and azobiscyclohexanonitrile.

The amounts that can be used of the peroxides and of the azo compounds are from about 0.5 to 15 phr, preferably from 1 to 10 phr, in particular from 2 to 8 phr (based in each case on the active substance).

It is also possible, of course, to carry out the crosslinking reaction with the free-radical-generating substances mentioned in the presence of certain polyfunctional compounds, in order to improve the crosslinking yield. Polyfunctional compounds which can be used are those having at least 2, preferably from 2 to 4, copolymerizable carbon-carbon double bonds, e.g. diallylmelamine, diisopropenylbenzene, divinylbenzene, divinyl ether, divinyl sulphone, diallyl phthalate, triallyl cyanurate, triallyl isocyanurate, triallyl phosphate, 1,2-polybutadiene, N,N'-1,3-phenylenebismaleimide, 2,4-tolylenebis(maleimide) and/or triallyl trimellitate. Other compounds that can be used are the acrylates and methacrylates of polyhydric, preferably di- to tetrahydric, $C_2$-$C_{10}$ alcohols, e.g. ethylene glycol, 1,2-propanediol, butanediol, hexanediol, polyethylene glycol having from 2 to 20, preferably from 2 to 8, oxyethylene units, neopentyl glycol, bisphenol A, glycerol, trimethylolpropane, pentaerythritol, sorbitol, and unsaturated polyesters derived from aliphatic di- and polyols, and similarly maleic acid, fumaric acid and/or itaconic acid.

Preferred compounds are: triallyl cyanurate, triallyl isocyanurate, N,N'-1,3-phenylenebismaleimide, 1,2-polybutadiene, triallyl phosphate and/or trimethylolpropane trimethacrylate.

The amounts that can be used of the polyfunctional compounds are from about 0.1 to 12 phr, preferably from 0.2 to 8 phr, particularly preferably from 0.5 to 5 phr.

The inventive crosslinking of the hydrogenated vinylpolybutadienes can moreover also use other known auxiliaries and additives. Mention may be made of antioxidants, fillers, plasticizers or mould-release agents by way of example.

Antioxidants which can be used are in particular those which exert minimum interference via scavenging of free radicals during the free-radical crosslinking of hydrogenated vinylpolybutadienes. In particular, they are oligomerized 2,2,4-trimethyl-1,2-dihydroquinoline (TMQ), styrenated diphenylamine (DDA), octylated diphenylamine (OCD) or the zinc salt of 4- and 5-methylmercaptobenzimidazole (ZMB2). Alongside these it is also possible to use the known phenolic antioxidants, such as sterically hindered phenols and, respectively, antioxidants based on phenylenediamine. It is also possible to use combinations of the antioxidants mentioned.

The amounts usually used of the antioxidants are from about 0.1 to 5 phr, preferably from 0.3 to 3phr, based on the total amount of polymer.

Examples of mould-release agents which can be used are: saturated and partially unsaturated fatty and oleic acids and their derivatives (fatty acid esters, fatty acid salts, fatty alcohols, fatty acid amides), these preferably being used as a constituent of a mixture, and also products which can be applied to the mould surface, e.g. products based on low-molecular-weight silicone compounds, products based on fluoropolymers and products based on phenolic resins.

The amounts used of the mould-release agents as a constituent of a mixture are from about 0.2 to 10 phr, preferably from 0.5 to 5 phr, based on the total amount of polymer.

Examples of fillers which can be used are carbon black, silica, calcium carbonate, barium sulphate, zinc oxide, magnesium oxide, aluminium oxide, iron oxide, diatomaceous earth, cork flour and/or silicates. The selection of the fillers depends on the property profile to be established for the vulcanizates. In the event that the vulcanizates are, for example, to be rendered flame-retardant, it is advisable to use appropriate hydroxides, such as aluminium hydroxide, magnesium hydroxide, calcium hydroxide, and hydrous salts, in particular salts which bind water in the form of water of crystallization.

The amounts generally used of the fillers are from about 1 to 150 phr. It is, of course, possible to use a very wide variety of fillers in a mixture.

Filler activators can also be added together with the fillers in order to achieve certain product properties and/or certain vulcanization properties. The filler activators can be added during preparation of the mixture. However, it is also possible to treat the filler with filler activator before it is added to the rubber mixture. To this end, organic silanes can be used, examples being vinyltrimethyloxysilane, vinyldimethoxymethylsilane, vinyltriethoxysilane, vinyltris (2-methoxy-ethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxy-silane or (octadecyl)methyldimethoxysilane. Examples of other filler activators are surfactants, such as triethanolamine and ethylene glycols having molar masses of from 74 to 10 000 g/mol. The amount of filler activators is usually from about 0.1 to 10%, based on the amount of filler used.

The vulcanizates can also be reinforced via addition of reinforcing materials, such as glass fibres, fibres composed of aliphatic and aromatic polyamides, e.g. Aramid®, polyester fibres, polyvinyl alcohol fibres, cellulose fibres, natural fibres, e.g. cotton or wood fibres or textiles composed of cotton, polyester, polyamide, glass cord and steel cord. These reinforcing materials or short fibres must, if appropriate, be modified to improve adhesion prior to their use (e.g. via RFL dip), in order to permit firm bonding to the elastomer. The amount of reinforcing material is usually from about 1 to 150 phr, based on the amount of polymer.

Plasticizers which can be used are amounts of up to 100 phr of the usual mineral oils.

It is, of course, also possible for other conventional additives and auxiliaries to be added to the vulcanizates if this should be necessary for the property profile of the inventively crosslinked hydrogenated vinylpolybutadienes.

It is also possible to use the inventive vulcanizates to produce composite articles with steel, with thermoplastics and with thermosets. The composite is produced either during the vulcanization process, if appropriate with the use of a suitable coupling agent system or after prior activation (e.g. etching, plasma activation) of the substrate or else via adhesive bonding after vulcanization.

The hydrogenated vinylpolybutadienes to be used according to the invention are mixed with the abovementioned additives prior to the vulcanization process in the usual assemblies, such as internal mixers or extruders or on rolls.

The mixing can be processed in the known manner, for example by calendering, transfer moulding, extrusion and injection moulding. The temperature during processing is to be selected so as to prevent premature vulcanization. To this end, appropriate preliminary experiments can be carried out.

The ideal temperature for carrying out the vulcanization process naturally depends on the reactivity of the crosslinking agent used and in the present case it can take place at temperatures of from room temperature (about 20° C.) to about 220° C., if appropriate under elevated pressure. The crosslinking times are generally from 20 seconds to 60 minutes, preferably from 30 seconds to 30 minutes.

The vulcanization reaction itself can be carried out in the usual way, in vulcanization presses, autoclaves, in the presence of hot air or of high-energy radiation (e.g. UV radiation or IR radiation) or else in a salt bath.

In order to achieve certain product properties or in order to remove decomposition products of the peroxide crosslinking agent, subsequent heat-conditioning can be necessary. In these cases, the temperatures used for subsequent heat-conditioning are in the range from 60° C. to 220° C. for a period of from about 2 minutes to 24 hours, if appropriate at reduced pressure.

The inventively crosslinked hydrogenated vinylpolybutadienes with the stated compression set values and compressive stress relaxation values serve for production of technical rubber products of any type, in particular for production of hoses, gaskets of any type, profiles, bellows, sealing collars, valves, protective caps, bearings and dampers, couplings, drive belts, coatings, sheets and coverings, soles, cable sheathing, membranes and composite particles composed of rubber/metal, rubber/plastic and rubber/textile.

EXAMPLES

1. Hydrogenated Vinylpolybutadiene Products (HVIBR) and Comparative EPDM Products Studied The starting materials for the hydrogenated vinylpolybutadienes (vinylpolybutadiene feedstocks) which were studied below were prepared according to the teaching of DE 10 324 304 A1.

The fundamental properties of the hydrogenated vinylpolybutadiene products used in the experiments below have been collated in Table 1.1 below:

TABLE 1.1

Fundamental properties of hydrogenated HVIBR grades

| Rubber | ML1 + 4/125° [MU] | Vinyl content (in feedstock) [%] | Degree of hydrogenation [%] | ΔH [cal/g] | Tg [° C.] | Ethylene content [%] | ENG centent [%] |
|---|---|---|---|---|---|---|---|
| HVIBR 96 | 90 | 49.3 | 96.2 | 0 | −61 | — | — |
| HVIBR 94 | 136 | 47.5 | 94.1 | 2.7 | −60 | — | — |
| HVIBR 86 | 78 | 50 | 85 | 0 | −62 | — | — |

The compound properties and vulcanizate properties of the hydrogenated vinylpolybutadiene were compared with those of established EPDM rubbers. The EPDM grades Buna® EP G 5450 and Buna® EP G 3440 are commercially available products from Lanxess Deutschland GmbH. Significant fundamental data for these EPDM grades have been collated in Table 1.2 here:

TABLE 1.2

Fundamental properties of comparative EPDM products

| Rubber | ML1 + 4/125° [MU] | Vinyl content (in feedstock) [%] | Degree of hydrogenation [%] | ΔH [cal/g] | Tg [° C.] | Ethylene content [%] | ENG content [%] |
|---|---|---|---|---|---|---|---|
| Buna ® EPG 5450 | 46 | — | — | 0.56 | −53.3 | 52 | 4.3 |
| Buna ® EPG 3440 | 28 | — | — | 0 | −52.2 | 48 | 4.1 |

2. Preparation, Vulcanization and Characterization of Rubber Mixtures

Three hydrogenated vinylpolybutadiene grades were compared with two EPDM grades on the basis of the properties of the unvulcanized and of the vulcanized compounded materials.

2.1 Preparation of Rubber Mixtures

To prepare the rubber mixtures, an internal mixer of capacity 1.5 l with "intermeshing rotor geometry" (GK1.5E from Werner & Pfleiderer) was used. First, in each case the rubber (HVIBR or EPDM) was added to the mixer. After 30 s, all of the other components except the peroxide were added and mixed at a constant rotor rotation rate of 40 rpm. After a mixing time of 4 min, the mixture was discharged and cooled to room temperature in air. Perkadox® BC40 B-PD was then incorporated by mixing on the roll at 40° C.

2.2 Constitution of Rubber Mixtures

| Rubber mixture No. |  | 2.1.1 | 2.1.2 | 2.1.3 | 2.1.4 | 2.1.5 |
|---|---|---|---|---|---|---|
| HVIBR 96 | [phr] | 100 |  |  |  |  |
| HVIBR 94 | [phr] |  | 100 |  |  |  |
| HVIBR 85 | [phr] |  |  | 100 |  |  |
| Buna EP G 5450 | [phr] |  |  |  | 100 |  |
| Buna EP G 3440 | [phr] |  |  |  |  | 100 |
| Corax ® N 550[1] | [phr] | 80 | 80 | 80 | 80 | 80 |
| Sunpar ® 2280[2] | [phr] | 50 | 50 | 50 | 50 | 50 |
| Vulkanox ® HS[3] | [phr] | 1 | 1 | 1 | 1 | 1 |
| Polyglykol ® 4000 S[4] | [phr] | 1 | 1 | 1 | 1 | 1 |
| Perkadox ® BC-40 B-PD[5] | [phr] | 7.5 | 7.5 | 7.5 | 7.5 | 7.5 |
| Rhenofit ® EDMA/S[6] | [phr] | 2 | 2 | 2 | 2 | 2 |

[1] Carbon black specified by Degussa AG
[2] Mineral oil plasticizer from Sunoco Rubber & Chemical
[3] 2,2,4-Tetramethyl-1,2-dihydroquinoline, polymerized, from Lanxess Deutschland GmbH
[4] Polyethylene glycol from Clariant
[5] Dicumyl peroxide, 40%, with inert fillers from Akzo Nobel
[6] Ethylene glycol dimethacrylate, bound with silica, from Rheinchemie Rheinau GmbH The following values were determined on the vulcanized rubber mixtures:

2.3 Properties of Rubber Mixtures

| Rubber mixture No. |  | 2.2.1 | 2.2.2 | 2.2.3 | 2.2.4 | 2.2.5 |
|---|---|---|---|---|---|---|
| Mooney viscosity (ML1 + 4/100° C.) to ASTM D 1646 | [MU] | 76 | 75 | 67 | 51 | 34 |

-continued

| Rubber mixture No. |  | 2.2.1 | 2.2.2 | 2.2.3 | 2.2.4 | 2.2.5 |
|---|---|---|---|---|---|---|
| Mooney relaxation (MR) to ISO 289, Part 4 | [%] | 3.8 | 9.8 | 5.4 | 4.3 | 4.4 |

The vulcanization performance of the mixtures was studied to ASTM D 5289 at 180° C. with the aid of the MDR 2000 from Alpha Technology Moving Die Rheometers. The characteristic vulcameter values $F_a$, $F_{max}$, $F_{max}-F_a$, $T_{10}$, $t_{50}$, $t_{90}$ and $t_{95}$ were thus determined.

2.4 Vulcanization Performance of Rubber Mixtures

| Rubber mixture No. |  | 2.3.1 | 2.3.2 | 2.3.3 | 2.3.4 | 2.3.5 |
|---|---|---|---|---|---|---|
| $F_a$ | [dNm] | 1.77 | 1.92 | 1.76 | 1.03 | 0.68 |
| $F_{max}$ | [dNm] | 9.46 | 9.00 | 11.39 | 9.86 | 7.24 |
| $F_{max} - F_a$ | [dNm] | 7.69 | 7.08 | 9.63 | 8.83 | 6.56 |
| $t_{10}$ | [min] | 0.52 | 0.52 | 0.50 | 0.64 | 0.71 |
| $t_{50}$ | [min] | 1.19 | 1.20 | 1.21 | 1.39 | 1.56 |
| $t_{9B}$ | [min] | 2.76 | 2.75 | 2.96 | 3.09 | 3.49 |
| $t_{95}$ | [min] | 3.45 | 3.42 | 3.71 | 3.94 | 4.47 |

Definitions to DIN 53 529, Part 3 are:

$F_a$: vulcameter value indicated at minimum of crosslinking isotherm $F_{max}$: maximum vulcameter value indicated $F_{max}-F_a$: difference between maximum and minimum of vulcameter values indicated $t_{10}$: juncture at which 10% of final conversion has been achieved $t_{50}$: juncture at which 50% of final conversion has been achieved $t_{90}$: juncture at which 90% of final conversion has been achieved $t_{95}$: juncture at which 95% of final conversion has been achieved The mixtures were vulcanized in a platen press at a pressure of 170 bar at 180° C. with the $t_{95}$ times stated in Tab. 2.3.

The following test values were determined on the unaged vulcanizates at 23° C. and 70° C.

2.5 Vulcanizate Properties of Rubber Mixtures

| Rubber mixture No. | | 2.4.1 | 2.4.2 | 2.4.3 | 2.4.4 | 2.4.5 |
|---|---|---|---|---|---|---|
| Shore A hardness at 23° C./DIN 53 505 | [ShA] | 48 | 47 | 51 | 50 | 45 |
| Shore A hardness at 70° C./DIN 53 505 | [ShA] | 45 | 45 | 55 | 46 | 41 |
| Rebound elasticity at 23° C. to DIN 53 512 | [%] | 47.2 | 50.8 | 47 | 49 | 45 |
| Rebound elasticity at 70° C. to DIN 53 512 | [%] | 51.1 | 56.6 | 58 | 50 | 42.5 |
| Tensile stress value at 25% tensile strain ($\sigma_{25}$) 23° C./DIN 53 504 | [MPa] | 0.49 | 0.48 | 0.53 | 0.55 | 0.47 |
| Tensile stress value at 100% tensile strain ($\sigma_{100}$) 23° C./DIN 53 504 | [MPa] | 1.2 | 1.3 | 1.6 | 1.1 | 1.0 |
| Tensile stress value at 300% tensile strain ($\sigma_{300}$) 23° C./DIN 53 504 | [MPa] | 5.1 | 6.4 | 6.0 | 5.0 | 4.2 |
| Tensile strength ($\sigma_{max.}$) 23° C./DIN 53 504 | [MPa] | 11.2 | 12.8 | 11.2 | 12.0 | 9.9 |
| Tensile strain at break ($\epsilon_b$) 23° C./DIN 53 504 | [%] | 826 | 693 | 469 | 639 | 662 |
| Compression set after 70 h/23° C. (DIN 53 517 A) | [%] | 10.3 | 8.5 | 4.1 | 14.6 | 19.2 |
| Compression set after 70 h/100° C. (DIN 53 517 A) | [%] | 14.7 | 11.8 | 7.2 | 19.9 | 23.6 |
| Compression set after 70 h/125° C. (DIN 53 517 A) | [%] | 16.3 | 14.2 | 8.9 | 20.6 | 23.1 |
| Compression set after 70 h/150° C. (DIN 53 517 A) | [%] | 23.8 | 20.9 | 18.5 | 28.6 | 33.5 |
| Compressive stress relaxation after 24 h at 23° C. (DIN 53 537) | [%] | 4.1 | 3.9 | 3.2 | 12.5 | 13.3 |
| Compressive stress relaxation after 72 h at 23° C. (DIN 53 537) | [%] | 7.2 | 6.1 | 4.1 | 14.5 | 18.3 |
| Compressive stress relaxation after 168 h at 23° C. (DIN 53 537) | [%] | 10.9 | 9.5 | 5.9 | 19.1 | 26.2 |

The physical parameters were determined to the appropriate DIN, ISO or ASTM specifications. Kleemann, Weber, Formeln und Tabellen für die Elastomerverarbeitung [Formulae and tables for elastomer processing], Dr. Gupta Verlag, 1994 is used as supplementary reference.

3. Discussion of Results

The inventive examples show that the values for compression set over a wide temperature range and the values for compressive stress relaxation are more advantageous for the vulcanized rubber mixtures composed of hydrogenated vinylpolybutadiene than for the comparative examples. At the same time, the order of magnitude of the other mechanical properties of the HVIBR vulcanizates is at a level approximately the same as that for the EPDM comparative examples.

What is claimed is:

1. A peroxidically crosslinked hydrogenated vinylpolybutadiene, having compression set values in the range from

| a) | 0 to 14% | at 23° C./70 h, |
| b) | 0 to 19% | at 100° C./70 h, |
| c) | 0 to 20% | at 125° C./70 h, and |
| d) | 0 to 28% | at 150° C./70 h; | and compressive stress relaxation values in the range from

| e) | 0 to 10% | at 23° C./24 h, |
| f) | 0 to 12% | at 23° C./72 h, and |
| g) | 0 to 15% | at 23° C./168 h; and | said peroxidically crosslinked hydrogenated vinylpolybutadiene being formed by crosslinking a hydrogenated vinylpolybutadiene via a peroxide, said hydrogenated vinylpolybutadiene having a degree of hydrogenation in the range from 85 to 96.2%.

2. A technical rubber product, comprising: peroxidically crosslinked hydrogenated vinylpolybutadiene according to claim 1.

3. The technical rubber product according to claim 2, wherein the technical rubber product comprises one or more hoses, gaskets of any type, profiles, bellows, sealing collars, valves, protective caps, bearings and dampers, couplings, drive belts, coatings, sheets and coverings, soles, cable sheathing, membranes and composite particles composed of rubber/metal, rubber/plastic and rubber/textile.

* * * * *